(12) United States Patent
Chou

(10) Patent No.: US 7,767,760 B2
(45) Date of Patent: *Aug. 3, 2010

(54) HOT MELT ADHESIVE COMPOSITION

(75) Inventor: Richard T. Chou, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 178 days.

This patent is subject to a terminal disclaimer.

(21) Appl. No.: 11/642,107

(22) Filed: Dec. 20, 2006

(65) Prior Publication Data

US 2007/0155904 A1 Jul. 5, 2007

Related U.S. Application Data

(60) Provisional application No. 60/755,567, filed on Dec. 30, 2005.

(51) Int. Cl.
*C08L 33/02* (2006.01)
(52) U.S. Cl. ............... 525/207; 525/210; 525/221; 524/272; 524/487; 524/499
(58) Field of Classification Search ............... 525/207, 525/210, 221; 524/272, 499
See application file for complete search history.

(56) References Cited

U.S. PATENT DOCUMENTS

| | | | | |
|---|---|---|---|---|
| 4,813,947 A * | 3/1989 | Korpman | ................. | 604/387 |
| 5,217,812 A | 6/1993 | Lee | | |
| 5,242,980 A * | 9/1993 | Tse | ................. | 525/114 |
| 5,326,413 A * | 7/1994 | Esemplare et al. | ......... | 156/154 |
| 5,382,615 A | 1/1995 | Godfrey | | |
| 5,401,791 A | 3/1995 | Milks | | |
| 5,458,982 A | 10/1995 | Godfrey | | |
| 5,548,027 A * | 8/1996 | Heucher et al. | ............. | 525/179 |
| 6,211,291 B1 | 4/2001 | Rolland et al. | | |
| 6,465,107 B1 | 10/2002 | Kelly | | |
| 6,528,550 B1 | 3/2003 | Hsu et al. | | |
| 6,756,443 B2 | 6/2004 | Feinberg | | |
| 6,846,874 B2 * | 1/2005 | Baumert et al. | ............. | 524/538 |
| 6,946,528 B2 | 9/2005 | Domine et al. | | |
| 7,199,188 B2 | 4/2007 | Chou | | |
| 7,222,380 B2 | 5/2007 | Chen | | |
| 7,279,520 B2 | 10/2007 | Hausmann et al. | | |
| 2003/0091760 A1* | 5/2003 | Drogou et al. | ............. | 428/34.2 |
| 2004/0198897 A1 | 10/2004 | Domine et al. | | |
| 2005/0020762 A1 | 1/2005 | Chou et al. | | |
| 2005/0187315 A1 | 8/2005 | Dean | | |
| 2005/0228145 A1 | 10/2005 | Lacroix et al. | | |
| 2006/0025527 A1 | 2/2006 | Chou | | |
| 2006/0052511 A1 | 3/2006 | Fan et al. | | |
| 2006/0160952 A1 | 7/2006 | Chou et al. | | |
| 2007/0255007 A1 | 11/2007 | Dean | | |
| 2008/0255303 A1 | 10/2008 | Chou | | |
| 2009/0215928 A1 | 8/2009 | Chou et al. | | |
| 2009/0227739 A1 | 9/2009 | Chou | | |
| 2009/0274856 A1 | 11/2009 | Chou | | |
| 2009/0298372 A1 | 12/2009 | Chou et al. | | |
| 2010/0069562 A1 | 3/2010 | Dean | | |

FOREIGN PATENT DOCUMENTS

| | | |
|---|---|---|
| EP | 0 463 841 A1 | 1/1992 |
| GB | 1157569 | 7/1969 |
| WO | WO 94/12584 | 6/1994 |
| WO | WO 95/09898 | 4/1995 |
| WO | 02/102898 A1 | 12/2002 |
| WO | 03/099930 A1 | 12/2003 |

OTHER PUBLICATIONS

PCT International Search Report and Written Opinion for International Application No. PCT/US2006/049313 dated May 15, 2007.
Richard T. Chou, U.S. Appl. No. 12/276,822, Laminated Articles Comprising a Sheet of a Blend of Ethylene Copolymers, filed Nov. 24, 2008.
David M. Dean, U.S. Appl. No. 12/707,745, Process for Recycling Polyolefin Blend Composition Using an Ethylene Copolymer Compatibilizing Agent, filed Feb. 18, 2010.
David M. Dean, U.S. Appl. No. 12/707,769, Process for Recycling Polyolefin Blend Composition Using an Ethylene Copolymer Compatibilizing Agent, filed Feb. 18, 2010.

* cited by examiner

*Primary Examiner*—Peter Szekely

(57) ABSTRACT

A hot melt adhesive composition comprising: (a) a functional copolymer obtained from copolymerization of ethylene and a comonomer selected from maleic anhydride, citraconic anhydride, itaconic anhydride, tetrahydrophthalic anhydride, maleic acid, citraconic acid, itaconic acid, fumaric acid, tetrahydrophthalic acid, the corresponding salts, monoesters and diesters of these acids, and mixtures of any of these, wherein the functional copolymer is present in an amount from about 5 to about 95 weight % of the combined total amount of (a) and (b); and (b) at least one ethylene copolymer obtained from copolymerization of ethylene with a polar monomer wherein said polar comonomer is present in the copolymer in an amount of from 8 to 40 weight %, wherein said ethylene copolymer is selected from the group consisting of ethylene/vinyl acetate copolymers, ethylene/alkyl (meth) acrylate copolymers and ethylene/alkyl (meth)acrylate/carbon monoxide terpolymers, in an amount from about 5 to about 95 weight % of the combined total amount of (a) and (b); wherein the composition has a melt index of 100 grams/10 minutes or higher. Articles comprising and process using the hot melt adhesive are also disclosed.

25 Claims, No Drawings

HOT MELT ADHESIVE COMPOSITION

CROSS REFERENCE TO RELATED APPLICATION

This application claims priority to U.S. provisional application Ser. No. 60/755,567, filed Dec. 30, 2005, the entire disclosure of which is incorporated herein by reference.

FIELD OF THE INVENTION

This invention relates to hot melt adhesive compositions comprising ethylene copolymers. The invention further provides articles of manufacture using such hot melt adhesives, such as cartons, cases, trays, books, assembled products, and disposables.

BACKGROUND OF THE INVENTION

Hot melt adhesives are thermoplastics based on polymer compositions that liquefy between temperatures of 80° C. to 220° C. and solidify again when cooled. Hot melt adhesives are desirable for their quick setting and/or the absence of aqueous or solvent media that provide fluidity to other types of adhesives. They consist of dry polymer (less than 5% liquid) and are applied in a molten state without using water or solvents. Hot melt adhesives are considered environmentally friendly and can provide a manufacturing benefit by reducing the number of steps in an operation or by allowing the conversion of an operation to automation.

Hot melt adhesives are widely used in industry for various applications. Typical applications include product assembly, packaging such as case, carton or tray forming, and in glue sticks. Desirable properties in a hot melt adhesive include suitability for high temperature end use, low temperature flexibility, low viscosity, and thermal stability.

Hot melt adhesives can be categorized according to their working temperature and their adhesion function. For a given application, often the properties, the handling and equally importantly the cost are factors in choosing a hot melt adhesive. Hot melt adhesives in use today are generally based on low molecular weight polyethylene homopolymers (LMPE), ethylene vinyl acetate copolymers (EVA), polyamides and moisture cross-linkable polyurethanes. However, polyurethane hot melt adhesives are quite expensive, and polyamide hot melt adhesives are sensitive to water and steam and require higher temperatures for handling. LMPE-based hot melt formulations can have good elevated temperature end use characteristics, but are undesirably brittle at low temperatures. EVA is one of the most versatile hot melt adhesives, with lower cost, easy handling, and good adhesion to many substrates. However, EVA copolymers generally have poor elevated temperature performance (poor temperature resistance) and are prone to char, skin or gel when exposed to elevated temperatures in the presence of air. In addition, the adhesion of EVA-based adhesives may not be adequate for more demanding applications.

U.S. Pat. No. 6,946,528 discloses a hot melt adhesive composition comprising a tubular reactor copolymer of ethylene and at least 5 mol % of comonomer units derived from alkyl acrylates, alkyl methacrylates, or mixtures thereof, wherein the copolymer has: (a) a melt index from 300-10,000 g/10 min; (b) a maximum peak melting temperature of at least 100° C.; and (c) a temperature required to melt 50% of the copolymer of at least 80° C.

U.S. patent application Publication US2006/0025527 discloses adhesive compositions comprising nonfunctionalized base resins and functionalized ethylene copolymers such as ethylene/maleic anhydride (E/MAH) or ethylene/ethyl hydrogen maleate copolymers that can be applied as self-supporting films or can be co-extruded or extrusion coated onto a substrate.

There is a need for improved hot melt adhesives that can be applied at temperatures less than 180° C. and provide good bond strength (adhesion) to a broad spectrum of substrates. The adhesives desirably provide good toughness, good elevated and low temperature performance, including good heat resistance, thermal stability, and easy flow viscosity for handling.

SUMMARY OF THE INVENTION

This invention provides a hot melt adhesive composition comprising:

(a) a functional copolymer obtained from copolymerization of ethylene and a comonomer selected from maleic anhydride, citraconic anhydride, itaconic anhydride, tetrahydrophthalic anhydride, maleic acid, citraconic acid, itaconic acid, fumaric acid, tetrahydrophthalic acid, the corresponding salts, monoesters and diesters of these acids, and mixtures of any of these, wherein the functional copolymer is present in an amount from about 5 to about 95 weight % of the combined total amount of (a) and (b); and (b) at least one ethylene copolymer obtained from copolymerization of ethylene with a polar monomer wherein said polar comonomer is present in the copolymer in an amount of from 8 to 40 weight %, wherein said ethylene copolymer is selected from the group consisting of ethylene/vinyl acetate copolymers, ethylene/alkyl (meth)acrylate copolymers and ethylene/alkyl (meth)acrylate/carbon monoxide terpolymers, in an amount from about 5 to about 95 weight % of the combined total amount of (a) and (b); wherein the composition has a melt index of 100 grams/10 minutes or higher, preferably 150 grams/10 minutes or higher.

The hot melt adhesive composition can further comprise tackifiers, waxes, antioxidants, and/or other additives as desired. For example, an embodiment comprises (1) from about 50 weight % to about 90 weight % of the combination of (a) a functional copolymer obtained from copolymerization of ethylene and a comonomer selected from maleic anhydride, citraconic anhydride, itaconic anhydride, tetrahydrophthalic anhydride, maleic acid, citraconic acid, itaconic acid, fumaric acid, tetrahydrophthalic acid, the corresponding salts, monoesters and diesters of these acids, and mixtures of any of these, wherein the functional copolymer is present in an amount of from about 5 to about 95 weight % of the combined total amount of (a) and (b); and (b) at least one ethylene copolymer obtained from copolymerization of ethylene with a polar monomer wherein said polar comonomer is present in the copolymer in an amount of from 8 to 40 weight %, and wherein said ethylene copolymer is selected from the group consisting of ethylene/vinyl acetate copolymers, ethylene/alkyl (meth)acrylate copolymers and ethylene/alkyl (meth)acrylate/carbon monoxide terpolymers, in an amount from about 5 to about 95 weight % of the combined total amount of (a) and (b); and (2) from about 10 to about 50 weight %, based on the total weight of the composition, of (c) from 0 to about 50 weight %, based on the weight of the total composition, of wax;

(d) from 0 to about 50 weight %, based on the weight of the total composition, of tackifier; and (e) from 0 to about 15 weight %, based on the weight of the total composition, of other additives selected from the group consisting of plasticizers, stabilizers, antioxidants, ultraviolet ray absorbers, anti-static agents, dyes, pigments, coloring agents, inorganic fillers, fire-retardants, lubricants, reinforcing agents, processing aids, slip additives, antiblock agents, release agents and mixtures thereof. Preferably the total of (a), (b), (c), (d) and (e) is about 100 weight % of the hot melt adhesive composition.

In another aspect, the present invention is a process for joining a first substrate to a second substrate, the process comprising the steps of (i) applying to the first substrate a molten hot melt adhesive composition as described above; (ii) contacting the second substrate with the molten hot melt adhesive composition, (iii) allowing the molten hot melt adhesive composition to cool and solidify, thereby joining said substrates together.

In still another aspect, the present invention is directed to an article of manufacture comprising or prepared from the hot melt adhesive composition as described herein. One embodiment of the article is a glue stick prepared from the hot melt adhesive composition. In another embodiment, the article comprises the composition adhered to at least one surface or at least one substrate. For example, the article comprises a first surface and a second surface, wherein at least a portion of the second surface is adhered to at least a portion of the first surface by the hot melt adhesive composition. In other embodiments, the present invention provides an article such as a carton, case, tray, bookbinding, disposable, package, bag, clothing, shoe, sporting good, automotive part, book or nonwoven textile including or prepared from a hot melt adhesive composition described herein. The article also includes a packaged article, such as a packaged food article, wherein the package comprises the hot melt adhesive composition, or is formed and/or sealed by using the hot melt adhesive composition.

The invention also provides a method of sealing and/or forming a case, carton, tray, bag or book comprising applying the hot melt adhesive composition as described above to seal and/or form the case, carton, tray, bag or book.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Although methods and materials similar or equivalent to those described herein can be used in the practice or testing of the present invention, suitable methods and materials are described herein.

"Copolymer" means a polymer containing two or more different monomers. The terms "dipolymer" and "terpolymer" mean polymers containing only two and three different monomers respectively. The phrase "copolymer of various monomers" means a copolymer whose units are derived from the various monomers.

The term "(meth)acrylic acid" is shorthand notation for methacrylic acid and/or acrylic acid. Likewise, the term "(meth)acrylate" is shorthand notation for methacrylate and/or acrylate.

The terms "finite amount" and "finite value" refer to an amount that is greater than zero.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B". Exclusive "or" is designated herein by terms such as "either A or B" and "one of A or B", for example.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. When a range begins with 0, the component the range refers to may not be present or it may be present in a finite amount (that is, the component is an optional component).

When materials, methods, or machinery are described herein with the term "known to those of skill in the art", or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Finally, all percentages, parts, ratios, and the like set forth herein are by weight, unless otherwise stated in specific instances.

Thermoplastic compositions are polymeric materials that can flow when heated under pressure. Melt index (MI) is the mass rate of flow of a polymer through a specified capillary under controlled conditions of temperature and pressure. Melt indices reported herein are determined according to ASTM 1238 at 190° C. using a 2160 g weight, with values of MI reported in grams/10 minutes.

The invention is directed to a low application temperature, high heat resistant hot melt adhesive comprising an adhesive polymer blend, having a MI of at least about 100 grams/10 minutes, comprising a copolymer obtained from copolymerization of ethylene and maleic anhydride or another polar reactive functional group and at least one ethylene copolymer obtained from copolymerization of ethylene with a polar monomer, and optionally wax, tackifier and/or other additives. Preferred are blends having a MI of at least about 150 grams/10 minutes, more preferably from about 200 to about 10,000 grams/1 minutes. The adhesive is particularly well-suited for use in automated assembly applications.

Functional Ethylene Copolymers

The hot melt adhesive composition comprises as a first component (a) a functional copolymer obtained from copolymerization of ethylene and maleic anhydride or another polar reactive functional group. As used herein, the term "functional copolymer" is used as shorthand notation for a copolymer containing a comonomer with a polar reactive functional group; for example, maleic anhydride. Without being limited by any particular theory, the reactive functional group is capable of chemically interacting with other components of the composition and/or with the substrate to form chemically associated loci. For example, they may react with nucleophiles to form covalently bonded links, or they may form ionic bonds. The maleic anhydride or other polar reactive functional groups provide a reactive functionality that promotes adhesion of the composition to the substrate. Other polar reactive functional groups include citraconic anhydride, itaconic anhydride, and tetrahydrophthalic anhydride. They also include maleic acid, citraconic acid, itaconic acid, fumaric acid, tetrahydrophthalic acid and the corresponding salts, monoesters or diesters of these acids.

Salts of the acids are prepared by treating the acid moieties with basic compounds to neutralize the acid moieties with an alkali metal cation, an alkaline earth metal cation or a transition metal cation, such as lithium, sodium, potassium, magnesium, calcium or zinc, or combinations of such cations, preferably by treating a copolymer of ethylene and an acid, such as maleic acid, with a basic compound. Basic compounds of note include formates, acetates, nitrates, carbonates, hydrogencarbonates, oxides, hydroxides or alkoxides of the ions of alkali metals, especially sodium and potassium, and formates, acetates, nitrates, oxides, hydroxides or alkoxides of the ions of alkaline earth metals and transition metals. Of particular note are sodium hydroxide, potassium hydroxide, sodium acetate, potassium acetate, sodium carbonate and potassium carbonate.

Preferred are copolymers of ethylene and maleic anhydride or copolymers of ethylene and monoalkyl maleates (also known as alkyl hydrogen maleates). As used herein, the terms "ethylene/monoalkyl maleate copolymers" and "E/MAME" refer to dipolymers prepared from ethylene and a maleic acid monoester (wherein one carboxyl group of the maleic moiety is esterified and the other is a carboxylic acid) and E/X/Y terpolymers, wherein E is ethylene; X is a monomer selected from the group consisting of vinyl acetate, alkyl (meth)acrylates, and (meth)acrylic acids; and Y is a maleic acid monoester, including maleic monoesters of $C_1$ to $C_4$ alcohols, such as for example, methyl, ethyl, n-propyl, isopropyl, and n-butyl alcohols, wherein X is less than 10 weight %, and preferably less than 5 weight % of the terpolymer. Examples of monomers suitable for inclusion as X are (meth)acrylic acid esters of $C_1$ to $C_4$ alcohols. Methyl acrylate and butyl acrylate are particular examples of acrylate monomers suitable for inclusion as X.

For example, the E/X/Y terpolymers include ethylene/maleic acid monoester/n-butyl (meth)acrylate, ethylene/maleic acid monoester/methyl (meth)acrylate, and ethylene/maleic acid mono-ester/ethyl (meth)acrylate terpolymers. For such copolymers, the alcohol moiety used in the maleic acid monoester comonomer may be the same as that used in the alkyl (meth)acrylate comonomer, or it may be different. Of particular note are copolymers of ethylene and monoalkyl maleate including ethyl hydrogen maleate as the monoalkyl maleate, such as ethylene/ethyl hydrogen maleate dipolymers.

Ethylene/monoalkyl maleate copolymers can be obtained by a high-pressure free radical polymerization process. A suitable high-pressure process is described, for example, in U.S. Pat. No. 4,351,931.

Polar Ethylene Copolymers

The hot melt adhesive composition comprises as a second component (b) at least one ethylene copolymer obtained from copolymerization of ethylene with a polar monomer (a polar ethylene copolymer). Polar monomers suitable for copolymerization with ethylene include vinyl acetate, alkyl (meth) acrylates and carbon monoxide (CO) comonomers. Such copolymers include ethylene/vinyl acetate copolymers (EVA's) and ethylene/alkyl (meth)acrylate copolymers, including ethylene/alkyl (meth)acrylate/CO copolymers and/or mixtures of any of these. Combinations of two or more polar ethylene copolymers, each having the same polar comonomer at different weight %, may be used. Combinations of two or more polar ethylene copolymers with different polar comonomers may also be used.

Ethylene/Vinyl Acetate Copolymers

The hot melt adhesive composition can comprise at least one ethylene/vinyl acetate copolymer (an EVA copolymer). The term "ethylene/vinyl acetate dipolymers" includes copolymers derived from the copolymerization of ethylene and vinyl acetate.

The relative amount of the vinyl acetate comonomer incorporated into ethylene/vinyl acetate copolymers can, in principle, vary broadly from a few weight percent up to as high as 45 weight percent of the total copolymer or even higher. The relative amount of the vinyl acetate present can be viewed as establishing how and to what degree the resulting ethylene copolymer is to be viewed as a polar polymeric constituent in the blended composition.

The ethylene/vinyl acetate copolymer can have varied amounts of vinyl acetate content, but preferably has a vinyl acetate unit content of from 6 to 40% by weight, especially from 12 to 32% by weight. The ethylene/vinyl acetate copolymer may optionally be modified by methods well known in the art (for example, grafting), including modification with an unsaturated carboxylic acid or its derivatives.

Suitable ethylene/vinyl acetate copolymers include those available from E.I. du Pont de Nemours and Company (DuPont), Wilmington, Del. under the ELVAX tradename. Other ethylene/vinyl acetate copolymers are available from Exxon Chemical Co. under the tradename ESCORENE and also from Millennium Petrochemicals, Rolling Meadows, Ill., under the tradename ULTRATHENE and AT copolymers available from AT Polymers & Film Co., Charlotte, N.C. and EVATANE from Atofina Chemicals, Philadelphia, Pa.

A mixture of two or more different ethylene/vinyl acetate copolymers can be used in the hot melt adhesive compositions in place of a single copolymer as long as the average values for the comonomer content will be within the range indicated above. Particularly useful properties may be obtained when two or more properly selected ethylene/vinyl acetate copolymers are used in the blends.

Ethylene/Alkyl (Meth)acrylate Copolymers

The hot melt adhesive composition may comprise at least one ethylene/alkyl (meth)acrylate copolymer. The term "ethylene/alkyl (meth)acrylate copolymers" includes copolymers of ethylene and alkyl (meth)acrylates wherein the alkyl moiety contains from one to eight carbon atoms.

The relative amount of the alkyl (meth)acrylate comonomer incorporated into the ethylene/(meth)alkyl acrylate copolymer can, in principle, vary broadly from a few weight percent up to as high as 40 weight percent of the total copolymer or even higher. Similarly, the choice of the alkyl group can, again in principle, vary from a simple methyl group up to an eight-carbon atom alkyl group with or without significant branching. The relative amount and choice of the alkyl group present in the alkyl (meth)acrylate ester comonomer can be viewed as establishing how and to what degree the resulting ethylene copolymer is to be viewed as a polar polymeric constituent in the blended composition.

Preferably, the alkyl group in the alkyl (meth)acrylate comonomer has from one to four carbon atoms and the alkyl (meth)acrylate comonomer has a concentration range of from 6 to 40 weight percent of the ethylene/alkyl (meth)acrylate copolymer, preferably from 12 to 32 weight %.

Preferred are ethylene/alkyl acrylate copolymers. Examples of alkyl acrylates include methyl acrylate, ethyl acrylate, butyl acrylate and 2-ethyl hexyl acrylate. "Ethylene/methyl acrylate" (EMA) means a copolymer of ethylene and methyl acrylate. "Ethylene/ethyl acrylate" (EEA) means a copolymer of ethylene and ethyl acrylate. "Ethylene/butyl acrylate" (EBA) means a copolymer of ethylene and butyl acrylate. Of note are ethylene/butyl acrylate copolymers prepared from i-butyl acrylate comonomers (EiBA) and ethylene/butyl acrylate copolymers prepared from n-butyl acrylate comonomers (EnBA).

Ethylene/alkyl (meth)acrylate copolymers can be prepared by processes well known in the polymer art using either autoclave or tubular reactors. The copolymerization can be run as a continuous process in an autoclave: ethylene, the alkyl (meth)acrylate, and optionally a solvent such as methanol (see U.S. Pat. No. 5,028,674) are fed continuously into a stirred autoclave such as the type disclosed in U.S. Pat. No. 2,897,183, together with an initiator.

In a particularly preferred embodiment, the ethylene copolymer is of the type that is prepared in a tubular reactor, according to the procedure described in the article "High Flexibility EMA Made from High Pressure Tubular Process" (Annual Technical Conference—Society of Plastics Engineers (2002), 60th (Vol. 2), 1832-1836).

The manufacturing of the tubular reactor ethylene/alkyl (meth)acrylate copolymers is preferably in a high pressure, tubular reactor at elevated temperature with additional introduction of reactant comonomer along the tube and not merely manufactured in a stirred high-temperature and high-pressure autoclave type reactor. However, it should be appreciated that similar ethylene/alkyl (meth)acrylate copolymeric material can be produced in a series of autoclave reactors wherein comonomer replacement is achieved by multiple zone introduction of reactant comonomer as taught in U.S. Pat. Nos. 3,350,372; 3,756,996; and 5,532,066, and as such these high melting point materials should be considered equivalent for purposes of this invention.

Suitable ethylene/alkyl (meth)acrylate copolymers include those available from DuPont under the ELVALOY AC tradename.

A mixture of two or more different ethylene/alkyl (meth)acrylate copolymers can be used in the hot melt adhesive composition in place of a single copolymer as long as the average values for the comonomer content will be within the range indicated above. Particularly useful properties may be obtained when two or more properly selected ethylene/alkyl (meth)acrylate copolymers are used in blends.

Ethylene/Alkyl (meth)acrylate/Carbon Monoxide Terpolymers

The hot melt adhesive composition may comprise an ethylene/alkyl (meth)acrylate/carbon monoxide terpolymer wherein the alkyl moiety contains from one to eight carbon atoms.

The relative amount of the alkyl (meth)acrylate comonomer incorporated into the ethylene/(meth)alkyl acrylate/carbon monoxide terpolymer can, in principle, vary broadly from a few weight percent up to as high as 40 weight percent of the total copolymer or even higher. Similarly, the choice of the alkyl group can, again in principle, vary from a simple methyl group up to an eight-carbon atom alkyl group with or without significant branching. The relative amount and choice of the alkyl group present in the alkyl (meth)acrylate ester comonomer can be viewed as establishing how and to what degree the resulting ethylene copolymer is to be viewed as a polar polymeric constituent in the blended composition. The terpolymer also contains carbon monoxide, which also contributes to the polar character of the blended composition.

Preferably, the alkyl group in the alkyl (meth)acrylate comonomer has from one to four carbon atoms and the alkyl (meth)acrylate comonomer has a concentration range of from 6 to 40 weight percent of the ethylene/alkyl (meth)acrylate copolymer, preferably from 12 to 32 weight %.

Preferred are ethylene/alkyl acrylate/carbon monoxide terpolymers. Examples of alkyl acrylates include methyl acrylate, ethyl acrylate, butyl acrylate and 2-ethyl hexyl acrylate. Of note are ethylene/n-butyl acrylate/carbon monoxide (EnBACO) terpolymers.

These terpolymers can be prepared by copolymerization of ethylene, alky (meth)acrylate and carbon monoxide by either autoclave or tubular processes, similar to those processes described above. Suitable ethylene/alkyl (meth)acrylate/CO copolymers include those available from DuPont under the ELVALOY HP tradename.

The adhesive composition can further comprise either (c) a wax or (d) at least one tackifier, or both (c) and (d).

Waxes

Waxes optionally can be used to modify the properties of a hot melt composition. Wax can reduce the overall viscosity of the adhesive, thereby allowing it to liquefy easily. The wax may also control the open time, set speed and thermal stability of the system. The wax, when present, is preferably included in a finite amount of at least about 0.1 weight %, at least about 2 weight %, or at least about 5 weight % of the total weight of the adhesive composition. Also preferably, the wax is present in a finite amount of up to about 10 weight %, 20 weight %, 25 weight %, 30 weight %, 35 weight %, 40 weight %, or 50 weight %, based on the total weight of the adhesive composition.

Suitable waxes include paraffin waxes, microcrystalline waxes, high-density low molecular weight polyethylene waxes, by-product polyethylene waxes, Fischer-Tropsch waxes, oxidized Fischer-Tropsch waxes and functionalized waxes such as hydroxy stearamide waxes and fatty amide waxes. The term "synthetic high melting point waxes" includes high-density low molecular weight polyethylene waxes, by-product polyethylene waxes and Fischer-Tropsch waxes. Modified waxes, such as vinyl acetate-modified and maleic anhydride-modified waxes may also be used.

Notable paraffin waxes have a ring and ball softening point of about 55° C. to about 85° C. Paraffin waxes include OKERIN 236 TP available from Astor Wax Corporation, Doraville, Ga.; PENRECO 4913 available from Pennzoil Products Co., Houston, Tex.; R-7152 Paraffin Wax available from Moore & Munger, Shelton, Conn.; and Paraffin Wax 1297 available from International Waxes, Ltd in Ontario, Canada. Other notable paraffin waxes have melting points in the range of about 55 to 75° C., such as, for example, PACEMAKER available from Citgo, and R-2540 available from Moore and Munger; and low melting synthetic Fischer-Tropsch waxes having a melting point of less than about 80° C. Particularly notable is paraffin wax with a melting point of about 65° C. Other paraffinic waxes include waxes available from CP Hall (Stow, Ohio) under the product designations 1230, 1236, 1240, 1245, 1246, 1255, 1260 and 1262.

Other suitable waxes include those described in U.S. Pat. No. 6,890,982, such as waxes prepared from hydrogenated plant oils. The waxes comprise a triglyceride whose fatty acids are predominantly stearic acid.

Wax may be present in up to 50 weight % of the hot melt composition; for example, from 10 to 50 weight % when a tackifier is not present. When used in combination with at least one tackifier, preferably from about 5 to about 45 weight % wax is present. Preferred waxes have a melting point of from about 60° C. to about 68° C. and have oil content of less than about 0.5, preferably less than about 0.2 weight %.

Tackifying Resins

Optionally, tackifiers may be used primarily to enhance initial adhesion to differentiated substrates. Tack is useful in a hot melt adhesive composition to allow for proper joining of articles before the heated adhesive hardens. Tackifiers are added to give tack to the adhesive and also to lower viscosity. The tackifier allows the composition to be more adhesive by improving wetting during the application. The presence of tackifiers lowers the resistance to deformation and hence facilitates bond formation on contact.

The tackifier, when present, is preferably included in a finite amount of at least about 0.1 weight %, at least about 2 weight %, or at least about 5 weight % of the total weight of the adhesive composition. Also preferably, the tackifier is present in a finite amount of up to about 10 weight %, 20 weight %, 25 weight %, 30 weight %, 35 weight %, 40 weight %, or 50 weight %, based on the total weight of the adhesive composition.

The tackifier may be any suitable tackifier known generally in the art such as those listed in U.S. Pat. No. 3,484,405. Such tackifiers include a variety of natural and synthetic resins and rosin materials. The resins that can be employed are liquid, semi-solid to solid, complex amorphous materials generally in the form of mixtures of organic compounds having no definite melting point and no tendency to crystallize. Such resins are insoluble in water and can be of vegetable or animal origin, or can be synthetic resins. The resins can provide substantial and improved tackiness to the composition. Suitable tackifiers include but are not necessarily limited to the resins discussed below.

A class of resin components that can be employed as the tackifier composition is the coumarone-indene resins, such as the para-coumarone-indene resins. Generally the coumarone-indene resins that can be employed have a molecular weight that ranges from about 500 to about 5,000. Examples of resins of this type that are available commercially include those materials marketed as PICCO-25 and PICCO-100.

Another class of tackifier resins is terpene resins, including also styrenated terpenes. These terpene resins can have a molecular weight range from about 600 to 6,000. Typical commercially available resins of this type are marketed as PICCOLYTE S-100, as STAYBELITE Ester #10, which is a glycerol ester of hydrogenated rosin, and as WINGTACK 95, which is a polyterpene resin.

A third class of resins that can be employed as the tackifier are the butadiene-styrene resins having a molecular weight ranging from about 500 to about 5,000. A typical commercial product of this type is marketed as BUTON 100, a liquid butadiene-styrene copolymer resin having a molecular weight of about 2,500. A fourth class of tackifier resins are polybutadiene resins having a molecular weight ranging from about 500 to about 5,000. A commercially available product of this type is that marketed as BUTON 150, a liquid polybutadiene resin having a molecular weight of about 2,000 to about 2,500.

A fifth class of resins that can be employed as the tackifier are the so-called hydrocarbon resins produced by catalytic polymerization of selected fractions obtained in the refining of petroleum, and having a molecular weight range of about 500 to about 5,000. Examples of such resin are those marketed as PICCOPALE-100, and as AMOCO and VELSICOL resins. Similarly, polybutenes obtained from the polymerization of isobutylene may be included as a tackifier.

The tackifier may also include rosin materials, low molecular weight styrene hard resins such as the material marketed as PICCOLASTIC A-75, disproportionated pentaerythritol esters, and copolymers of aromatic and aliphatic monomer systems of the type marketed as VELSICOL WX-1232.

Rosins useful as tackifiers may be any standard material of commerce known as "rosin", or a feedstock containing rosin. Rosin is mainly a mixture of $C_{20}$, tricyclic fused-ring, monocarboxylic acids, typified by pimaric and abietic acids, which are commonly referred to as "resin acids." Any one or more of the $C_{20}$ cyclic carboxylic acid-containing isomers present in rosin may be used. Rosin is the residue left after distilling off the volatile oil from the oleoresin obtained from *Pinus palustris* and other species of *Pinus*, Pinaceae. It is available as wood rosin (from Southern pine stumps after harvesting the stumps, chipping the stumps into small chips, extracting the chips with hexane or higher-boiling paraffin, and distilling the hexane or paraffin to yield wood rosin) gum rosin (the exudates from incisions in the living tree, *P. palustris* and *P. caribaea*) and tall oil rosin. Rosin contains about 90% resin acids and about 10% neutral matter. The acids present in natural rosin may be purified by, for example, by saponification, extraction of the neutral matter and reacidifying. Of the resin acids about 90% are isomeric with abietic acid ($C_{20}H_{30}O_2$); the other 10% is a mixture of dihydroabietic acid ($C_{20}H_{32}O_2$) and dehydroabietic acid ($C_{20}H_{28}O_2$). (See *The Merck Index, Tenth Ed.* Rahway, N.J., USA, 1983, page 1191, entry 8134). Tall oil, also known as liquid rosin, is a byproduct of the wood pulp industry and is usually recovered from pinewood "black liquor" of the sulfate or Kraft paper process. According to the Kraft process, pinewood is digested with alkali and sulfide, producing tall oil soap and crude sulfate turpentine as by-products. Acidification of this soap followed by fractionation of the crude tall oil yields tall oil rosin and fatty acids. Tall oil typically contains rosin acids (34 to 40%), fatty acids such as oleic and linoleic acids (50-60%) and neutral matter (5 to 10%). (See *The Merck Index, Tenth Ed.*, page 1299, entry 8917). Preferably, the rosin contains at least 90 weight % resin acids, and less than 10 weight % fatty acids. Some rosin dimerization product, which may form during the fractionation process, may also be present in the tall oil rosin. Rosin is available commercially in several grades (for example, under the tradename RESINALL from Resinall Corporation, and other products supplied by Hercules, Aarakawa, etc.). A standard grade of rosin is available commercially from Union Camp Corporation (Wayne, N.J.) under the UNITOL tradename. Commercially available rosins that can be used to practice the invention also include SYLVARES RE 115, available from Arizona Chemical and SYLVARES RE 104, available from Arizona Chemical.

As used herein, the term "rosin" collectively includes natural rosins, liquid rosins, modified rosins and the purified rosin acids, and derivatives of rosin acids, including partially to completely neutralized salts with metal ions, e.g. resinate, etc. The rosin may be gum, wood or tall oil rosin but preferably is tall oil rosin.

The rosin material may be modified rosin such as dimerized rosin, hydrogenated rosin, disproportionated rosin, or esters of rosin. Essentially any reaction conditions recognized in the art for preparing modified rosin resins (including derivatives thereof) may be employed to prepare a modified rosin. Rosins can be modified by, for example, esterification of some or all of the carboxylic moieties or by forming carboxylate salts by saponification. Esters can be prepared by esterifying the rosin with polyhydric alcohols containing from 2 to 6 alcohol groups.

Phenolic-modified rosin esters are typically prepared by the reaction of rosin and a phenolic compound. This phenolic resin is then esterified with a polyhydric alcohol providing phenolic-modified rosin esters. Typically, the combinations of reactants are exposed to an elevated temperature in the range of 100 to 300° C. At these elevated temperatures, the reactants undergo covalent bond-forming reactions with other reactants, so that a resinous material is formed. Reaction products of rosins and their methods of preparation are well known in the art (See for example U.S. Pat. No. 2,007,983).

Aromatic tackifiers include thermoplastic hydrocarbon resins derived from styrene, alpha-methylstyrene, and/or vinyltoluene, and polymers, copolymers and terpolymers thereof, terpenes, terpene phenolics, modified terpenes, and combinations thereof. KRYSTALEX 3100 is a low molecular weight thermoplastic hydrocarbon polymer derived largely from alphamethylstryene with a Ring and Ball softening point of 97 to 103° C., commercially available from Hercules Inc.

A more comprehensive listing of tackifiers, which can be employed, is provided in the TAPPI CA Report #55, February 1975, pages 13-20, inclusive, a publication of the Technical Association of the Pulp and Paper Industry, Atlanta, Ga., which lists well over 200 tackifier resins that are commercially available.

Preferred tackifiers will generally have average softening points ranging from about 85° C. to about 130° C., more typically from about 100° C. to about 125° C., will have a weight average molecular weight greater than about 1000, will have an acid number of less than about 20 and will have a viscosity at 125° C. of greater than about 10,000 cp.

One can determine the molecular weight and softening point of a tackifier by dissolving the material in a suitable solvent such as tetrahydrofuran, and analyzing a sample of that solution using gel permeation chromatography. The molecular weight average in grams/mole, Mw, is determined by comparison to the retention time and elution profile of polystyrene standards of known molecular weight (commercially available from many Chromatography supply houses, e.g., Supelco, Inc. or Waters Associates). The softening point may be measured using a Mettler FP90 Central Processor and a Mettler FP83 HT Dropping Point cell with a softening point ring.

Tackifiers may be present in up to 50 weight % of the hot melt composition; for example, from 10 to 50 weight % when wax is not present. When used in combination with wax, preferably from about 5 to about 45 weight % of tackifier is present. Mixtures of two or more of the tackifying resins may be required for some formulations.

Other Additives

The adhesive compositions can additionally comprise small amounts of optional materials commonly used and well known in the polymer art. Such optional additives (component (e) above) include plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, processing aids, slip additives, anti-block agents such as silica or talc, release agents and/or mixtures thereof. These additives are described in the Kirk Othmer *Encyclopedia of Chemical Technology*.

These additives, when present, may be present in the composition in finite amounts of at least about 0.01 weight %, at least about 0.1 weight %, at least about 2 weight %, or at least about 5 weight % of the total weight of the adhesive composition up to about 15% of the total weight of the adhesive composition. The additives may be present in amounts that are generally from 0.01 to 15 weight %, preferably from 0.01 to 10 weight %, so long as they do not detract from the basic and novel characteristics of the composition and do not significantly adversely affect the qualities, such as adhesive, of the composition. Many such additives may be present in from 0.01 to 5 weight %.

Liquid plasticizers such as oils, and solid plasticizers such as benzoate esters available from Velsicol Chemical Corp. in Rosemont, Ill. under the trade name BENZOFLEX, can be used to obtain longer open times, lower viscosity, improved adhesion and improved cold temperature flexibility. Plasticizing oils that may be useful include olefin oligomers and low molecular weight polymers, as well as vegetable and animal oils and their derivatives. Suitable petroleum-derived oils are relatively high boiling point materials containing only a minor proportion of aromatic hydrocarbons, preferably less than 30%, and more preferably less than 15% by weight of the oil. Alternatively, the oil may be essentially free of aromatics.

Stabilizers or antioxidants are added to protect the adhesive from degradation caused by reaction with oxygen induced by such things as heat, light, or residual catalyst from the raw materials such as the tackifying resin.

Among the applicable stabilizers or antioxidants included herein are high molecular weight hindered phenols and multifunctional phenols such as sulfur and phosphorous-containing phenol. Hindered phenols are characterized as phenolic compounds that contain sterically bulky radicals in close proximity to the phenolic hydroxyl group. Representative hindered phenols include; 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-proplonate; n-octadecyl-3(3,5-di-tert-butyl-4-hydroxyphenyl)-propionate; 4,4'-methylenebis (2,6-tert-butyl-phenol); 4,4'-thiobis (8tert-butyl-o-cresol); 2,6-di-n-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5di-tert-butyl-4-hydroxy-phenyl)-propionate].

The performance of these antioxidants may be enhanced by using known synergists such as, for example, thiodipropionate esters and phosphites. Distearylthiodipropionate is particularly useful.

Such antioxidants are commercially available from Ciba-Geigy, Hawthorne, N.Y. and include hindered phenols IRGANOX 565, 1010 and 1076. These are primary antioxidants that act as radical scavengers and may be used alone or in combination with other antioxidants such as phosphite antioxidants like IRGAFOS 168 available from Ciba-Geigy. Phosphite catalysts are considered secondary catalysts and are not generally used alone. These are primarily used as peroxide decomposers. Other available catalysts are CYANOX LTDP available from Cytec Industries in Stamford, Conn., and ETHANOX 1330 available from Albemarle Corp. in Baton Rouge, La. Many such antioxidants are available either to be used alone or in combination with other such antioxidants. These stabilizers, if used, are generally present in amounts up to about 2 weight %, such as about 0.1 to 1.5 weight %, preferably from 0.25 to 1.0 weight %.

The composition optionally further comprises a cross linking agent selected from the group consisting of melamine resins, epoxy resins, amine-containing resins, metal alkoxides and metal salts of organic acids. Cross linking, also known as curing, can provide stronger and more elastic adhesive compositions by forming reversible or irreversible links between the individual polymer chains. Heat and/or pressure can cure the adhesive composition after it has been applied. Although a cross linking agent may be desirable in some cases, cross linking is not necessary in others. Accordingly, of note is the composition that does not comprise a cross-linking agent.

Cross linking or curing agents that can be used with E/MAME copolymers containing acid cure sites include di- and multi-functional amine-containing resins, such as hexamethylenediamine carbamate (HMDAC), hexamethylenediamine (HMDA), triethylenetetramine, tetramethylene-pentamine, hexamethylenediamine-cinnamaldehyde adduct, and hexamethylene-diamine dibenzoate salt. Aromatic amines can also be used as curing agents. Combinations of two or more curing agents may also be used. The curing agent(s) may be added neat or in an inert carrier. Methods for curing using aqueous HMDA are described in U.S. Pat. No. 7,001,957.

The incorporation of such optional additives into the compositions can be carried out by any known process. This incorporation can be carried out, for example, by dry blending, by extruding a mixture of the various constituents, by a masterbatch technique, or the like. The adhesive compositions are prepared by blending the polymeric ingredients, and optional waxes, tackifiers, and other additives using conventional masticating equipment, for example, a rubber mill, Brabender Mixer, Banbury Mixer, Buss-Ko Kneader, Farrel continuous mixer or twin-screw continuous mixer in the melt at a temperature from about 130° C., to about 210° C. until a homogeneous blend is obtained. Mixing temperatures depend upon the particular adhesive formulation, with about 150 to about 160° C. being a suitable range. Other embodiments use mixing temperatures selected from the following ranges: 130-160; 130-200; 150-160; and 150-200° C. Various methods of blending are known in the art and any method that produces a homogeneous blend is satisfactory.

In one embodiment, combinations of (a) a copolymer of ethylene and maleic anhydride or other polar reactive comonomer and (b) a copolymer of ethylene with a polar monomer such as an ethylene/vinyl acetate copolymer, ethylene/alkyl (meth)acrylate copolymer or ethylene/alkyl (meth)acrylate/carbon monoxide terpolymer are themselves suitable for use as hot melt adhesives, without the need to incorporate additional components. It should be understood that for these "neat" adhesives, the term "adhesive composition" is still used, although the composition may comprise only the combination of (a) and (b). In another embodiment, the adhesive composition does not require a tackifier (e.g., the combination of (a) and (b) itself, or formulated with other, non-tackifier additives such as wax), or use only a relatively small amount of tackifier, such as adhesive compositions with less than 20% tackifier by weight.

The hot melt adhesives are suited to various applications, such as but not limited to: packaging applications, such as forming and/or sealing cases, cartons, trays and the like; bookbinding; disposables; and product assembly.

The hot-melt adhesive is readily applied to at least one substrate. For example, the hot-melt adhesive can be applied to sheeting products (for example, decorative, reflective, and graphical), labelstock, and tape backings. The substrate can be any suitable type of material depending on the desired application. The at least one substrate may be selected from the group consisting of woven or nonwoven fabric, metal, polymer, glass and cellulosic materials, such as wood and wood products, paper, and paperboard.

The substrates to which the adhesive can be adhered to include virgin and recycled paper, high and low density Kraft paper, chipboard and various types of treated and coated paper and chipboard, nonwoven textiles, release liners such as a siliconized liner, foil, polymeric materials such as polyethylene, MYLAR, polypropylene such as biaxially oriented polypropylene (BOPP), polyester such as polyethylene terephthalate, polyvinylidene chloride, ethylene vinyl acetate and various other polymers. Composite materials are also used for packaging applications such as for the packaging of alcoholic beverages. These composite materials may include chipboard laminated to an aluminum foil that is further laminated to film materials. Additionally, these film materials also may be bonded directly to chipboard or paper. The aforementioned substrates by no means represent an exhaustive list, as a tremendous variety of substrates, especially composite materials, find utility in the packaging industry.

Articles made of multiple parts can be assembled using the hot melt adhesives. For example, the molten adhesive is applied to a first part or a first surface and simultaneously or sequentially contacted with a second part or a second surface while still molten and allowed to cool, thereby attaching the parts or surfaces together. In other cases, in a first operation, the hot melt adhesive can be applied to a substrate (a first surface) and allowed to cool providing an article comprising the adhesive composition and the substrate. In a second operation, the article comprising the adhesive composition and the substrate is heated to soften the adhesive, the heated adhesive is contacted with a second surface and allowed to cool, thereby attaching the parts together. The parts or surfaces can comprise or be prepared from the substrates described above. The first surface and the second surface may be prepared from the same or different substrates.

The adhesive compositions exhibit a desirable temperature resistance, water and detergent resistance, flexibility, elasticity, and adhesion to fabrics and textiles, such as woven or nonwoven fabrics, making them well suited for preparing clothing such as athletic apparel or decorative clothing. For example, applying the adhesive composition to a substrate such as a fabric can form an adhesive/fabric composite that can be thermally adhered to another substrate. Clothing applications include adhesive interlinings, stitched seam taping or water-resistant coatings. Similarly, the compositions can be used to prepare and adhere decorative appliqués for, for example, athletic shoe applications.

The hot melt adhesives find particular use in packaging applications such as case, carton, and tray forming, and as sealing adhesives, including heat sealing applications, for example in the packaging of cereals, cracker and beer products. For the manufacture of corrugated cartons, especially those used for shipping refrigerated or frozen foods, or for shipping foods packed in ice, hot melt adhesives are generally selected because of their ability to maintain a strong bond under the difficult conditions, such as stress and shock in handling, high humidity and variations in the environmental temperature.

Encompassed by the invention are containers, e.g., cartons, cases, boxes, bags, trays, packages, and the like comprising the adhesive compositions. The containers may be formed using the compositions. Forming such packages generally comprises a combination of folding and/or overlaying a surface of the packaging material on another surface of packaging material with an intervening layer of the adhesive composition. After the molten adhesive composition contacts the surfaces, it is cooled and adheres the surfaces together. Alternatively or additionally, the hot melt adhesive composition can be applied to a package so that it can be heat sealed to enclose a product (that is, a packaged product). Accordingly, the invention provides a packaged product, such as a packaged food article, contained within a package, carton, case, tray or bag, wherein the package, carton, case, tray or bag comprises the hot melt adhesive described herein.

Hot melt adhesives for packaging are generally extruded in bead form onto a substrate using piston pump or gear pump extrusion equipment. Hot melt application equipment is available from several suppliers including Nordson, ITW and Slautterback. Wheel applicators are also commonly used for applying hot melt adhesives, but are used less frequently than extrusion equipment. The particular method of application will depend upon various factors well understood in the art, such as the article to which the adhesive is applied, and the conditions under which the adhesive or article needs to function. Application of hot melt adhesives by any such conventional techniques is well within the understanding of one skilled in the art.

The hot melt adhesives are also used in diverse areas, such as bookbinding; sealing the ends of paper bags; furniture manufacturing; and adhering other articles, such as woven or nonwoven fabrics, glass, metals and various plastics, including attaching paper labels to plastic containers. Additional uses of hot-melt adhesives include, but are not limited to, carpet seam sealing tape, lamination, article assembly, nonwoven construction, and potting and encapsulation compounds.

Articles such as sporting goods, shoes and automotive parts may be assembled in this manner. The adhesives are particularly useful for preparing parts for automotive interiors, such as sun visors, headliner structures, door panels, seating covers, and carpet mats that comprise fabric bonded to rigid cores or other substrates.

In addition to the uses described above, the adhesive compositions are suitable for other process applications.

Further embodiments include substrates and tapes (e.g., single-sided and double-sided tapes) comprising the hot-melt adhesive compositions. To form a tape, the hot-melt adhesive is coated onto at least a portion of a suitable backing. A release material such as low adhesion backsize can be applied to the opposite side of the backing, if desired. When double-sided tapes are formed, the hot-melt adhesive is coated onto at least a portion of both sides of the backing.

In another embodiment, the hot melt adhesives can be used in glue stick formulations where the improved heat resistance of such hot melt adhesives is advantageous. Thus, this embodiment provides a glue stick including a hot melt adhesive composition as described above. The glue stick, or a portion thereof, can be heated above the softening or melting point of the composition to apply the adhesive composition to one or more substrates.

In another embodiment, the adhesive compositions are sprayable.

While the invention has been particularly shown and described with reference to preferred embodiments thereof, it will be understood by those skilled in the art that various changes in form and details may be made without departing from the spirit and scope of the invention.

The following Examples are merely illustrative, and are not to be construed as limiting the scope of the invention described and/or claimed herein.

EXAMPLES

Materials Used

Nylon 6 is available from BASF under the tradename ULTRAMID B3.

Polyethelene terethphalate (PET) is available from DuPont under the tradename CRYSTAR 3924.

EVA-1 is an ethylene/vinyl acetate copolymer (28 weight % VA) with a MI of 400.

EVA-2 is an ethylene/vinyl acetate copolymer (18 weight % VA) with a MI of 500.

F-1 is an ethylene/maleic anhydride copolymer (E/MAH 85/15 weight %) with MI of 205 and a melting point of 104° C.

F-2 is an ethylene/ethyl maleic acid monoester copolymer (E/MAME 90.5/9.5 weight %) with MI of 30 and a melting point of 108° C.

Tests Used

Melt index (MI) of the compositions was measured using ASTM D 1238 using a 2.16 kg weight, and measured at 190° C.

Heat stress can be measured by forming a composite construction of adhesive between two pieces of corrugated paperboard of specific dimensions. The adhesive bead forming this composite is then placed under approximately 2 pounds of cantilever stress for 24 hours at elevated temperatures. The maximum temperature at which this construction remains intact for at least 24 hours is then noted.

The adhesion strength to aluminum foil was determined according to the following procedure. The compositions of Table 1 were press molded into films of 10 mil (0.25 mm) thickness. Three-layer composites were assembled by stacking in order: Al foil/molded film/Al foil. The Al foil was 5 mils (0.125 mm) thick. The stacked layers were pressed for 30 seconds at 44 psi pressure in a lamination press set at 135° C. to form the laminated composite structure. After the structure was cooled to room temperature, 1-inch wide strips were cut from the 3-layer composites. The peel strength strips were tested for adhesion characteristics in an INSTRON (90 degree peel test; at a speed of 50 mm/minute).

The adhesion strength to nylon 6 and PET was determined according to the following procedure. Nylon 6 or PET films of 10 mil thickness were prepared by press-molding at 250° C. Two-layer composites of nylon 6 film or PET and the molded films of Table 1 were assembled by stacking together. The stacked layers were then pressed for 30 seconds at 44 psi pressure in a lamination press set at either 120° C. or 150° C. to form the laminated composite structure. At the laminating temperatures used, both nylon 6 and PET do not melt, so that the inherent adhesion of the compositions toward nylon 6 and PET can be assessed. After the structure was cooled to room temperature, the two layer laminates were peeled apart by hand to assess seal strength and rated as follows:

4: A seal is "excellent" when the two films cannot be separated without rupture of the seal.

3: A seal is "good" when the two films can be separated with effort.

2: A seal is "poor" when the two films can be separated with ease.

1: The two films did not seal under the heat seal treatment.

The compositions used in the Examples in Table 1 were prepared by melt blending using a 30-mm diameter Werner & Pfleiderer twin screw extruder with a mixing screw, using a melt temperature of from 140° C. to 170° C. Properties obtained in Examples 1-3 and Comparative Example 1-2 are presented in Table 1. Comparative Examples 1 and 2 are typical EVA-based hot melt adhesive resins.

As shown in Table 1, at the press molding condition specified Comparative Examples 1 and 2 show very low adhesion to Al foil. The adhesion to PET is good for both Comparative Example 1 and 2, but both do not impart any adhesion to nylon 6. The Al foil and the comparative adhesives peeled readily apart.

The data in Table 1 demonstrate that the compositions of Examples 1, 2 and 3 improved adhesion to Al foil, and attained inseparable adhesion to PET and nylon 6 when press molded at 150° C. Example 1, 2 and 3 also retain high melt flow index. The temperature resistance is expected to improve because the melting temperatures of the components of Examples 1, 2 and 3 are higher.

TABLE 1

| Example | Composition | MI (190° C.) | Adhesion to Aluminum (lbs/inch) | Adhesion to nylon 6 | | Adhesion to PET | |
|---|---|---|---|---|---|---|---|
| | | | | (120° C.) | (150° C.) | (120° C.) | (150° C.) |
| C1 | EVA-1 | 400 | 1.2 | 1 | 1 | 3 | 4 |
| C2 | EVA-2 | 500 | 1.5 | 1 | 1 | 2 | 3 |
| 1 | EVA-1/F-1 (70/30%) | 350 | 4.4 | 2 | 4 | 4 | 4 |
| 2 | EVA-2/F-2 (80/20%) | 250 | 3.7 | 2 | 4 | 4 | 4 |
| 3 | EVA-2/F-2 (70/30%) | 190 | 3.4 | 2 | 4 | 4 | 4 |

Compared to the comparative EVA hot melts, the new compositions exhibit much improved adhesion to metals, fabrics, woods and other polymers. The compositions can be further cured and have higher usage temperature. The compositions are versatile for tailoring melt viscosity and performance.

Having thus described and exemplified the invention with a certain degree of particularity, it should be appreciated that the following claims are not to be so limited but are to be afforded a scope commensurate with the wording of each element of the claim and equivalents thereof.

What is claimed is:

1. A hot melt adhesive composition comprising:
   (a) a random copolymer obtained by a high-pressure free radical copolymerization process, said copolymer comprising a copolymer of ethylene and a comonomer selected from the group consisting of maleic anhydride, citraconic anhydride, itaconic anhydride, tetrahydrophthalic anhydride, maleic acid diesters, maleic acid monoesters, citraconic acid diesters, citraconic acid monoesters, itaconic acid diesters, itaconic acid monoesters, fumaric acid diesters, fumaric acid monoesters, tetrahydrophthalic acid diesters, tetrahydrophthalic acid monoesters, and mixtures of two or more thereof, wherein the random copolymer is present in an amount from about 5 to about 95 weight % of the combined total amount of (a) and (b); and
   (b) at least one ethylene copolymer obtained from copolymerization of ethylene with a polar comonomer wherein i) said polar comonomer is present in the copolymer in an amount of from 8 to 40 weight %, ii) said ethylene copolymer is selected from the group consisting of ethylene/vinyl acetate copolymers, ethylene/alkyl acrylate copolymers, ethylene/alkyl methacrylate copolymers, ethylene/alkyl acrylate/carbon monoxide terpolymers and ethylene/alkyl methacrylate/carbon monoxide terpolymers, and iii) said ethylene copolymer is present in an amount from about 5 to about 95 weight % based on the combined total amount of (a) and (b);
   wherein the composition has a melt index of 100 grams/10 minutes or higher.

2. The composition of claim 1 wherein the random copolymer (a) is a copolymer of ethylene and maleic anhydride.

3. The composition of claim 1 wherein the random copolymer (a) is a copolymer of ethylene and a monoalkyl maleate.

4. The composition of claim 3 wherein the monoalkyl maleate is ethyl hydrogen maleate.

5. The composition of claim 1 further comprising either (c) a wax or (d) at least one tackifier, or both (c) and (d).

6. The composition of claim 1 wherein the adhesive polymer has a melt index of at least 150 grams/10 minutes.

7. A hot melt adhesive composition of claim 1 comprising:
   (1) from about 50 weight % to about 90 weight %, based on the total weight of the composition of the combination of:
      (a) a random copolymer obtained by a high-pressure free radical copolymerization process, said copolymer comprising a copolymer of ethylene and a comonomer selected from the group consisting of maleic anhydride, citraconic anhydride, itaconic anhydride, tetrahydrophthalic anhydride, maleic acid diesters, maleic acid monoesters, citraconic acid diesters, citraconic acid monoesters, itaconic acid diesters, itaconic acid monoesters, fumaric acid diesters, fumaric acid monoesters, tetrahydrophthalic acid diesters, tetrahydrophthalic acid monoesters, and mixtures of two or more thereof, wherein the random copolymer is present in an amount of from about 5 to about 95 weight % of the combined total amount of (a) and (b); and
      (b) at least one ethylene copolymer obtained from copolymerization of ethylene with a polar comonomer wherein i) said polar comonomer is present in the copolymer in an amount of from 8 to 40 weight %, ii) said ethylene copolymer is selected from the group consisting of ethylene/vinyl acetate copolymers, ethylene/alkyl acrylate copolymers, ethylene/alkyl methacrylate copolymers, ethylene/alkyl acrylate/carbon monoxide terpolymers, and ethylene/alkyl methacrylate/carbon monoxide terpolymers, and iii) said ethylene copolymer is present in an amount from about 5 to about 95 weight % based on the combined total amount of (a) and (b); and (2) from about 10 to about 50 weight %, based on the total weight of the composition, of:
   (c) from 0 to about 50 weight %, based on the weight of the total composition, of wax;
   (d) from 0 to about 50 weight %, based on the weight of the total composition, of tackifier; and
   (e) from 0 to about 15 weight %, based on the weight of the total composition, of other additives selected from the group consisting of plasticizers, stabilizers, antioxidants, ultraviolet ray absorbers, anti-static agents, dyes, pigments, coloring agents, inorganic fillers, fire-retardants, lubricants, reinforcing agents, processing aids, slip additives, antiblock agents, release agents and mixtures thereof.

8. A hot melt adhesive composition of claim 7 wherein the total of (a), (b), (c), (d) and (e) is 100 weight % of the hot melt adhesive composition.

9. A composition of claim 8 wherein wax is present in an amount of at least about 0.1 weight % of the total weight of the hot melt adhesive composition.

10. A composition of claim 9 wherein wax is used in combination with at least one tackifier, and from about 5 to about 45 weight % wax is present, based on the total weight of the hot melt adhesive composition.

11. A composition of claim 8 wherein tackifier is present in an amount of at least about 0.1 weight % of the total weight of the hot melt adhesive composition.

12. A composition of claim 11 wherein tackifier is used in combination with wax, and from about 5 to about 45 weight % tackifier is present, based on the total weight of the hot melt adhesive composition.

13. A composition of claim 1 that does not comprise a cross linking agent.

14. The composition of claim 1 further comprising a cross linking agent selected from the group consisting of melamine resins, epoxy resins, amine-containing resins, metal alkoxides and metal salts of organic acids.

15. An article of manufacture prepared from the hot melt adhesive composition of claim 1.

16. An article of claim 15 that is a glue stick.

17. An article of claim 15 wherein the hot melt composition is adhered to at least one substrate.

18. An article of claim 17 wherein the at least one substrate is selected from the group consisting of woven fabrics, nonwoven fabrics, metals, polymers, glass and cellulosic materials.

19. An article of claim 15 wherein the article comprises a first surface and a second surface, wherein at least a portion of the second surface is adhered to at least a portion of the first surface by the hot melt adhesive composition.

20. An article of claim 15 that is a carton, case, tray, bookbinding, disposable package, bag, clothing, shoe, sporting good, automotive part, book or nonwoven textile.

21. An article of claim 20 further comprising a packaged article.

22. A packaged article of claim 21 that is a packaged food article.

23. A process for joining a first substrate to a second substrate, the process comprising the steps of (i) applying to the first substrate a molten hot melt adhesive composition according to claim 1; (ii) contacting the second substrate with the molten hot melt adhesive composition, (iii) allowing the molten hot melt adhesive composition to cool and solidify, thereby joining said substrates together.

24. A process for joining a first substrate to a second substrate, the process comprising the steps of (i) applying to the first substrate a molten hot melt adhesive composition according to claim 7; (ii) contacting the second substrate with the molten hot melt adhesive composition, (iii) allowing the molten hot melt adhesive composition to cool and solidify, thereby joining said substrates together.

25. A method of sealing and forming a case, carton, tray, bag or book comprising applying the hot melt adhesive composition of claim 1 to seal and form the case, carton, tray, bag or book.

* * * * *

UNITED STATES PATENT AND TRADEMARK OFFICE
CERTIFICATE OF CORRECTION

PATENT NO. : 7,767,760 B2
APPLICATION NO. : 11/642107
DATED : August 3, 2010
INVENTOR(S) : Richard T. Chou It is certified that error appears in the above-identified patent and that said Letters Patent is hereby corrected as shown below:

Column 16, lines 21 - 23, "F-1 is an ethylene/maleic anhydride copolymer (E/MAH 85/15 weight %) with MI of 205 and a melting point of 104°C." should read --F-1 is an ethylene/maleic acid monoester copolymer (E/MAME 85/15 weight %) with MI of 205 and a melting point of 104°C.--

Signed and Sealed this

Thirtieth Day of November, 2010

David J. Kappos
*Director of the United States Patent and Trademark Office*